(12) United States Patent
Leu

(10) Patent No.: US 11,868,198 B2
(45) Date of Patent: Jan. 9, 2024

(54) UPDATING COUNTERS DISTRIBUTED ACROSS A PLURALITY OF NODES

(71) Applicant: PayPal, Inc., San Jose, CA (US)

(72) Inventor: Eric Leu, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 150 days.

(21) Appl. No.: 17/356,244

(22) Filed: Jun. 23, 2021

(65) Prior Publication Data

US 2022/0413953 A1    Dec. 29, 2022

(51) Int. Cl.
*G06F 11/00* (2006.01)
*G06F 11/07* (2006.01)
*G06F 11/18* (2006.01)

(52) U.S. Cl.
CPC ........ *G06F 11/076* (2013.01); *G06F 11/0709* (2013.01); *G06F 11/0757* (2013.01); *G06F 11/181* (2013.01); *G06F 2201/88* (2013.01)

(58) Field of Classification Search
CPC .............. G06F 11/076; G06F 11/0709; G06F 11/0757; G06F 11/181; G06F 11/167
See application file for complete search history.

(56) References Cited

U.S. PATENT DOCUMENTS

| | | | |
|---|---|---|---|
| 7,395,527 B2 * | 7/2008 | DeWitt, Jr. | ......... G06F 11/3409 714/E11.2 |
| 8,266,281 B1 | 9/2012 | Carlson et al. | |
| 9,197,520 B2 | 11/2015 | Reynolds et al. | |
| 10,452,417 B2 | 10/2019 | Serebrin et al. | |
| 2015/0149890 A1 * | 5/2015 | Goedegebuure | ........ G06F 16/93 715/234 |
| 2017/0235579 A1 | 8/2017 | Knauth et al. | |

OTHER PUBLICATIONS

Veriato, Viewing Database Statistics, Sep. 1, 2017, https://help.veriato.com, 3 pages (Year: 2017).*

* cited by examiner

*Primary Examiner* — Katherine Lin
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to methods that include initializing, by a computer in a computer system, an event counter that includes a plurality of sub-counter groups, each plurality of sub-counter groups including at least two sub-counters located on different nodes of a plurality of nodes in the computer system. In response to an occurrence of an event associated with the event counter, the method may include the computer selecting a particular sub-counter group of the plurality of sub-counter groups to update, and sending, to sub-counters corresponding to the particular sub-counter group, a request to update a sub-counter value for the particular sub-counter group. In response to a request for a current count value of the event counter, the method may include outputting, by the computer, a sum of the sub-counter values for the plurality of sub-counter groups as the current count value.

20 Claims, 12 Drawing Sheets

Computer System *100*

800

```
┌─────────────────────────────────────────────────────────────────┐
│ Initializing, by a computer in a computer system, an event      │
│ counter that includes a plurality of sub-counter groups, each   │
│ plurality of sub-counter groups including at least two sub-     │
│ counters located on different nodes of a plurality of nodes in  │
│ the computer system.                                            │
│ 810                                                             │
└─────────────────────────────────────────────────────────────────┘
                                │
                                ▼
┌─────────────────────────────────────────────────────────────────┐
│ In response to an occurrence of an event associated with the    │
│ event counter, the computer:                                    │
│ 820                                                             │
│                                                                 │
│   ┌─────────────────────────────────────────────────────────┐   │
│   │ Selecting a particular sub-counter group of the         │   │
│   │ plurality of sub-counter groups to update.              │   │
│   │ 830                                                     │   │
│   └─────────────────────────────────────────────────────────┘   │
│                              │                                  │
│                              ▼                                  │
│   ┌─────────────────────────────────────────────────────────┐   │
│   │ Sending, to sub-counters corresponding to the particular│   │
│   │ sub-counter group, a request to update a sub-counter    │   │
│   │ value for the particular sub-counter group.             │   │
│   │ 840                                                     │   │
│   └─────────────────────────────────────────────────────────┘   │
└─────────────────────────────────────────────────────────────────┘
                                │
                                ▼
┌─────────────────────────────────────────────────────────────────┐
│ In response to a request for a current count value of the event │
│ counter, outputting, by the computer, a sum of the sub-counter  │
│ values for the plurality of sub-counter groups as the current   │
│ count value.                                                    │
│ 850                                                             │
└─────────────────────────────────────────────────────────────────┘
```

Determining, by the computer, that a particular node of the plurality of nodes is unavailable, wherein the particular node includes a respective sub-counter from at least one sub-counter group.
910

While the particular node is unavailable, eliminating from selection for modification the at least one sub-counter group.
920

UPDATING COUNTERS DISTRIBUTED ACROSS A PLURALITY OF NODES

BACKGROUND

Technical Field

This disclosure relates generally to computer system operation, and more particularly to techniques for updating distributed counters.

Description of the Related Art

Various forms of counters are used in a wide variety of computing applications. For example, email servers may track various statistics related to numbers of emails received in a period of time, respective numbers for total and unread emails in a given inbox, and the like. A database may track data concerning a number of records accessed, modified, created, deleted, moved, etc. A security process may track a number of failed login attempts performed from a particular internet protocol (IP) address, a particular postal code, city, country, and so forth, in order to detect a security attack. An online service that performs various forms of transactions with users may track a total number of transactions within a given time frame, as well as numbers of failed transaction attempts, successful transactions, and/or individually track transactions of various types, such as person-to-person, person-to-business, and business-to-business. Such transactions may include information queries, product searches, media requests, etc.

In some cases, the counters may be in use for a short time (e.g., for seconds or minutes) while in other cases, counters may remain active for much longer periods of time, such as hours, days, weeks, or longer. When a counter need is short-term, the counter may be implemented as a variable stored in a single non-volatile memory device such as random-access memory (RAM). In such cases, a risk of the memory device becoming unavailable may be insignificant, so no redundancy for the counter value is used. In longer-term cases, or in short-term cases in which the counter value is critical), the counter may be implemented using one or more replicated counter values, stored in different memory devices. If a given one of the memory devices becomes unavailable, the remaining replicates of the counter values may be used to maintain an accurate count.

One technique for managing replicated copies of a counter is a quorum technique. A quorum counter may include 'n' copies of a counter, where n is three or greater. When the counter value is to be incremented, a majority of the copies are selected, the current values read, and then the largest of the read values is incremented. All of the selected copies are then set to the incremented value. Accordingly, at any point in time, a majority of the replicated copies will have the correct count value, and as long as a majority of the counters are selected for a subsequent increment, at least one of the selected copies will have the correct/largest value. A disadvantage of this technique is that a majority of the multiple replicated copies of the counter value are both read and written for each counter update. This reading and writing may create additional communication traffic within a computer system, thereby reducing a bandwidth of the computer system.

BRIEF DESCRIPTION OF THE DRAWINGS

FIG. 8 illustrates a flow diagram of an embodiment of a method for updating a set of sub-counters of an event counter.

DETAILED DESCRIPTION

As described above, use of a quorum technique for managing replicated counter values may be effective, but at the cost of increased bandwidth within a given computer system. In some computer systems, hundreds, thousands, or more different counters may be utilized to track corresponding types of events. In a computer system with a national or global usage, thousands or more of these events may occur every second, which in turn may result in millions of counter updates being performed each second. In such an embodiment, the communication overhead of maintaining all of the counters may produce an unacceptable burden to the computer system.

The present disclosure recognizes a desire for a technique for implementing a fault-tolerant event counter that supports redundancy for an event counter without requiring read and write operations on every counter update. The proposed technique takes a new approach to update and read counters with replica sub-counters. The technique constructs fault-tolerant counters using sub-counters with replicas that are summed to generate the current count value. In other words, a particular counter includes multiple sub-counters, and one sub-counter (including replicas of the sub-counter on different nodes) is selected and then incremented for a given occurrence of an event being counted. To generate the count value, a value from one replica of each sub-counter is added together. Such an update technique may achieve higher concurrency and performance while meeting a consistency constraint.

Use of such a technique may allow the event counter to be updated without requiring both read and write operations of replicated copies of the event counter or sub-counters, thereby reducing communication overhead of a computer system. Updating of the sub-counters is not based on the quorum technique and may be tolerant for up to (n−1)/2 node failures, where 'n' represents a number of nodes over which the fault-tolerant event counter is implemented. Updating different sub-counters may be done in parallel without incurring a blocking condition. The disclosed techniques may further support updating a plurality of event counters in a batch, as will be described below, for high performance and scalability. Accordingly, the proposed technique may provide additional capabilities as well as reduced overhead.

Figure 1:
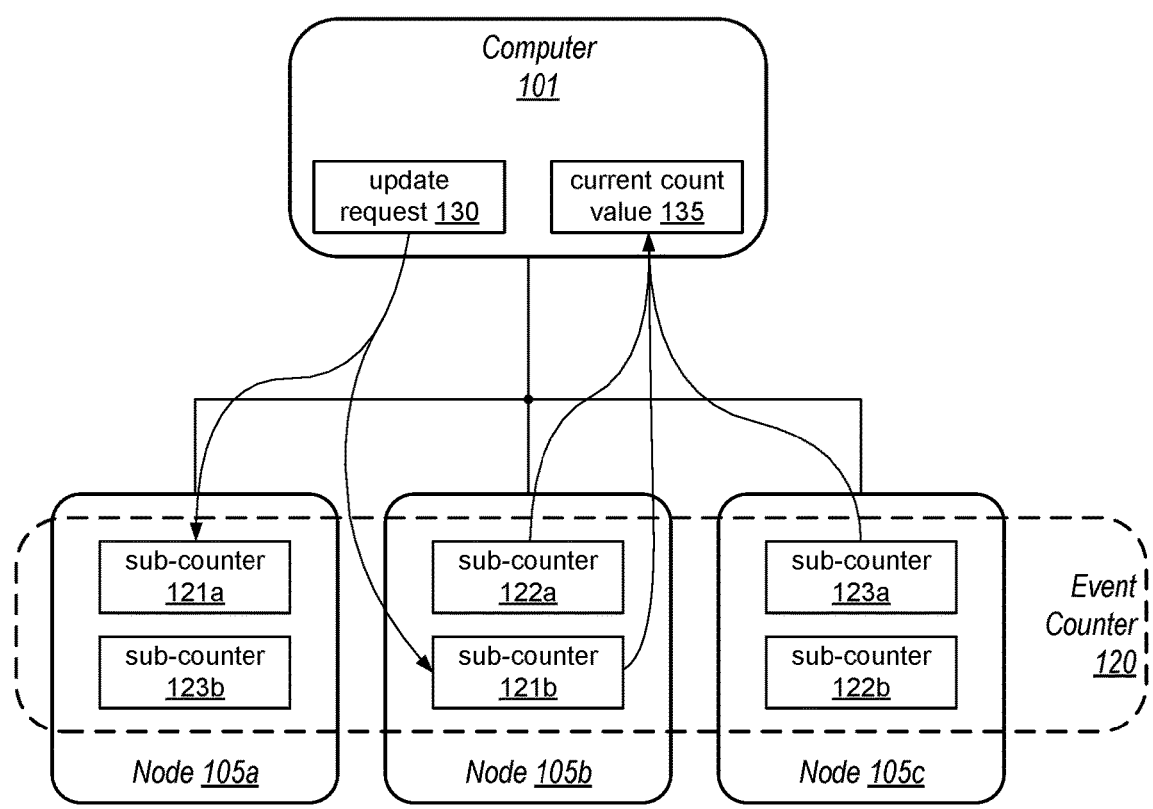
FIG. 1 is a block diagram illustrating an embodiment of a computer system which includes an event counter implemented using a plurality of sub-counters distributed across a plurality of nodes.

A block diagram of an embodiment of a computer system that includes an event counter distributed across a plurality of nodes is illustrated in FIG. 1. Computer system 100 includes computer 101 coupled to nodes 105a-105c (collectively nodes 105). Event counter 120 is implemented in computer system 100 by distributing three groups of sub-counters 121-123 across nodes 105. Each sub-counter group includes two sub-counters, labeled 'a' and 'b.' Although a single computer 101 is shown, computer system 100 may, in some embodiments, be a server computer system that includes a plurality of computers 101 and may further include additional nodes 105 beyond the three that are illustrated.

Computer system 100, as illustrated, may be an enterprise computer system, or a portion thereof. In various embodiments, computer 101 may be a single computer system or a plurality of computer systems included, for example, in a server farm. In some embodiments, computer 101 may be a subset of bandwidth of a server farm leased from a third party, e.g., a virtual computer. Nodes 105, as depicted, include memory circuits for storing program instructions and/or other forms of information that may be used by computer 101 and/or other computers in computer system 100. Nodes 105 may include any suitable combination of volatile and/or non-volatile memory circuits. For example, nodes 105a and 105b may each include dynamic RAM (DRAM) while node 105c includes flash memory. In other embodiments, nodes 105 may all include flash memory, or none may include non-volatile memory. In addition, each of nodes 105 may include a processor for performing memory management functions. In some embodiments, such a processor may be capable of executing other types of program applications that are in addition to memory management functions.

As shown, computer 101 utilizes event counter 120 to track a number of occurrences of a particular type of event. Any suitable type of event may be tracked, such as various events associated with sending and receiving email, managing a database, tracking user account login activity, tracking selection of various media products, managing transactions between various accounts, and the like. In some embodiments, maintaining an accurate count of the tracked events may have a high degree of importance and, therefore, efforts may be taken to protect the integrity of the count value. In some computer systems, storage nodes such as nodes 105 may occasionally be taken offline for various reasons, such as for data backup, replacement, maintenance such as defragmentation of stored files, and the like. In addition, nodes 105 may occasionally become unavailable for unexpected reasons, such as power outages or failure of the node itself. In the present embodiment, such efforts to retain the integrity include dividing event counter 120 into three sub-counter groups 121-123, with each of these sub-counter groups having two replicated copies distributed across different nodes. By replicating sub-counters, count values may be preserved in case a particular node becomes unavailable.

Computer 101 in computer system 100, as illustrated, initializes event counter 120 that includes a plurality of sub-counter groups 121-123. Each of sub-counter groups 121-123 includes at least two sub-counters (indicated by 'a' and 'b' labels) located on different ones of nodes 105 in computer system 100. Sub-counters 121a and 121b form a first sub-counter group, sub-counters 122a and 122b form a second sub-counter group, and sub-counters 123a and 123b form a third sub-counter group. Computer 101 distributes the sub-counters by placing the 'a' and 'b' sub-counters for ones of sub-counter groups 121-123 on different sets of nodes 105. The 'a' and 'b' sub-counters for respective ones of sub-counter groups 121-123 are located on different ones of nodes 105, such that no two nodes 105 include a same set of sub-counter groups 121-123. As shown, node 105a includes sub-counters from sub-counter groups 121 and 123, node 105b includes sub-counters from sub-counter groups 121 and 122, and node 105c includes sub-counters from sub-counter groups 122 and 123.

In response to an occurrence of an event associated with event counter 120, computer 101 selects a particular one of sub-counter groups 121-123 to update, such as sub-counter group 121. The particular occurrence of the event, as illustrated, may be any suitable event associated with the examples disclosed above, for example, an access of a record in a database. Both sub-counters 121a and 121b may be updated in response to the occurrence, while sub-counters of sub-counter groups 122 and 123 are not. In order to perform the update, computer 101 sends, to sub-counters 121a and 121b, a request to update a sub-counter value for sub-counter group 121. When an update is performed, the 'a' and 'b' sub-counters for a selected sub-counter group are both incremented. Accordingly, each occurrence of an event is counted on two different ones of nodes 105.

In response to a request for a current count value of the event counter, computer 101, as shown, outputs a sum of the sub-counter values for sub-counter groups 121-123 as the current count value. Since each sub-counter group 121-123 includes a set of replicated values, only one sub-counter from each group needs to be used when generating the sum. To sum values from each of sub-counter groups 121-123, computer 101 accesses two or more, but less than all, of nodes 105, and then reads at least one sub-counter value from respective sub-counters of sub-counter groups 121-123 on the accessed nodes 105. For example, to determine a current count value of event counter 120, computer 101 may access nodes 105b and 105c, allowing computer 101 to read the current values of sub-counter 121b, 122a, 122b, and 123a. Since sub-counters 121b and 123a are the only sub-counters from sub-counter groups 121 and 123, respectively, these two values are included in the current value. Values for sub-counters 122a and 122b should have the same value as both sub-counters of a selected group are updated in response to a same event. Accordingly, the one common value is summed with the values from sub-counters 121b and 123a. It is noted that nodes 105b and 105c form a proper subset of nodes 105, and includes at least two nodes.

It is also noted that the embodiment of FIG. 1 is merely an example. Elements of the computer system and processes have been simplified for clarity. Although only a single computer and three nodes are depicted, any suitable number of nodes and computers is contemplated in other embodiments. Event counter 120 is shown as being divided into three sub-counter groups with each group including two copies of a sub-counter. In other embodiments, the event counter may be divided into more than three sub-counter groups and/or each sub-counter group may include more than two replicated copies of the sub-counter. Although three nodes are illustrated, any suitable number of nodes may be included in the computer system. In such embodiments, some nodes may not include any sub-counters for a particular event counter.

The system of FIG. 1 includes a description of a computer system that uses a plurality of sub-counters to track a count value for an event counter. Various techniques may be utilized for managing these sub-counters. A particular example of managing a plurality of sub-counter groups is presented below.

Figure 2:
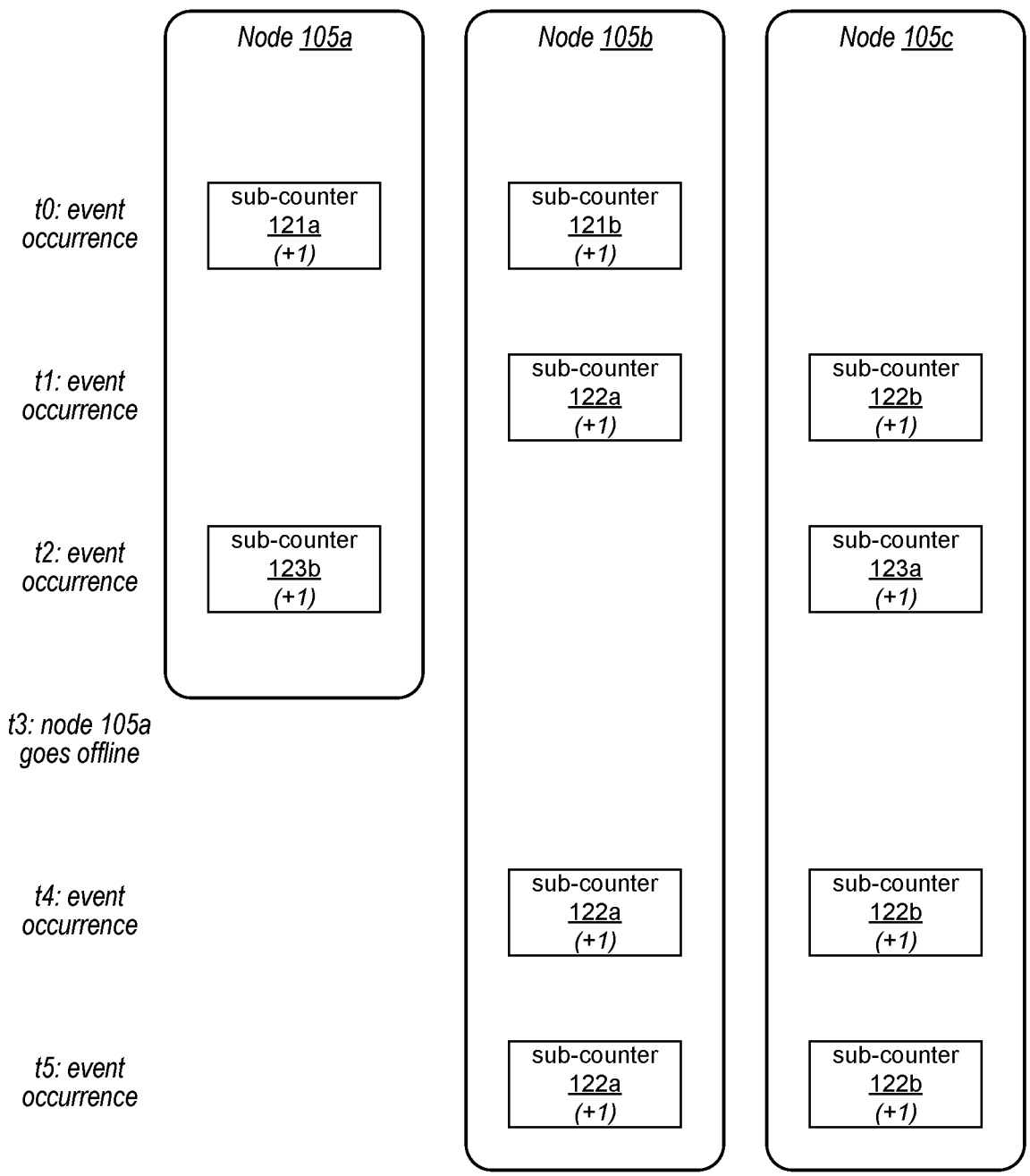
FIG. 2 depicts a timeline indicating a technique for updating the event counter of FIG. 1 in response to a series of events.

Moving to FIG. 2, an example associated with updating an event counter that includes a plurality of sub-counters is depicted. As illustrated, nodes 105 of computer system 100 are shown as various sub-counter groups 121-123 are updated over time, in response to a sequence of events from a time t0 to a time t5.

As shown, several occurrences of an event that is tracked using event counter 120 occur at times t0, t1, and t2. At time t0, sub-counter group 121 is selected by computer 101 and, in turn, sub-counters 121a and 121b (on nodes 105a and 105b, respectively) are both updated in response to one occurrence of the event. At time t1, there is another occurrence of the event and sub-counter group 122 is selected. Sub-counters 122a and 122b, on nodes 105b and 105c, respectively, are both updated. A third occurrence of the event occurs at time t2, and in response, sub-counter group 123 is selected. Sub-counters 123a and 123b, on nodes 105c and 105a, respectively, are both updated. It is noted that selection of the various sub-counter groups 121-123 is shown as occurring in a rotating order. In various embodiments, any suitable selection method may be utilized. For example, a current bandwidth of nodes 105 may be used to select a particular one of the sub-counter groups. For example, if at time t1, node 105b had less bandwidth than nodes 105a and 105c (e.g., an unrelated storage operation is being performed by node 105b), then sub-counter group 123 may be selected instead of sub-counter group 122 in order to avoid latency that may occur on node 105b due to the lack of bandwidth.

As shown at time t3, node 105a goes offline. Node 105a may be taken offline for various reasons, such as for maintenance (defragmentation of a hard-disk drive, garbage collection of deleted files on node 105a, etc.) or due to an unexpected power failure on node 105a (a power cord is disconnected, a fuse is blown, and the like), or other reasons as disclosed above. Computer 101 determines that node 105a is unavailable, and further determine that node 105a includes a respective sub-counter from sub-counter groups 121 and 123, but not sub-counter group 122. While node 105a is unavailable, including at times t4 and t5, computer 101 eliminates sub-counter groups 121 and 123 from selection for updating. Accordingly, in response to the occurrences of the event at times t4 and t5, sub-counter group 122 is selected for update both times. If node 105a comes back online, then sub-counter groups 121 and 123 may again be eligible for selection.

It is noted that, if event counter 120 is read while node 105a is offline, an accurate value of the current count may still be determined. Between nodes 105b and 105c, at least one respective sub-counter from each of sub-counter groups 121-123 is available to be read. In addition, by selecting the only sub-counter group with both sub-counters on nodes 105b and 105c, the updates to event counter 120 retain redundant updates. Accordingly, if one of nodes 105b or 105c were to have reduced bandwidth during an update, then the other node may still update in a timely fashion while the other node updates at a later point in time when its bandwidth allows.

It is also noted that the example of FIG. 2 is for demonstrating the disclosed concepts. As illustrated, the event counter is incremented by one for each event occurrence. In other embodiments, the event counter may be incremented or decremented by any suitable value. In some embodiments, different events may result in updating the event counter by different values. Only details related to these concepts have been illustrated. Although not shown, other activities may occur concurrently with, or between the events at the illustrated times.

Figure 3:
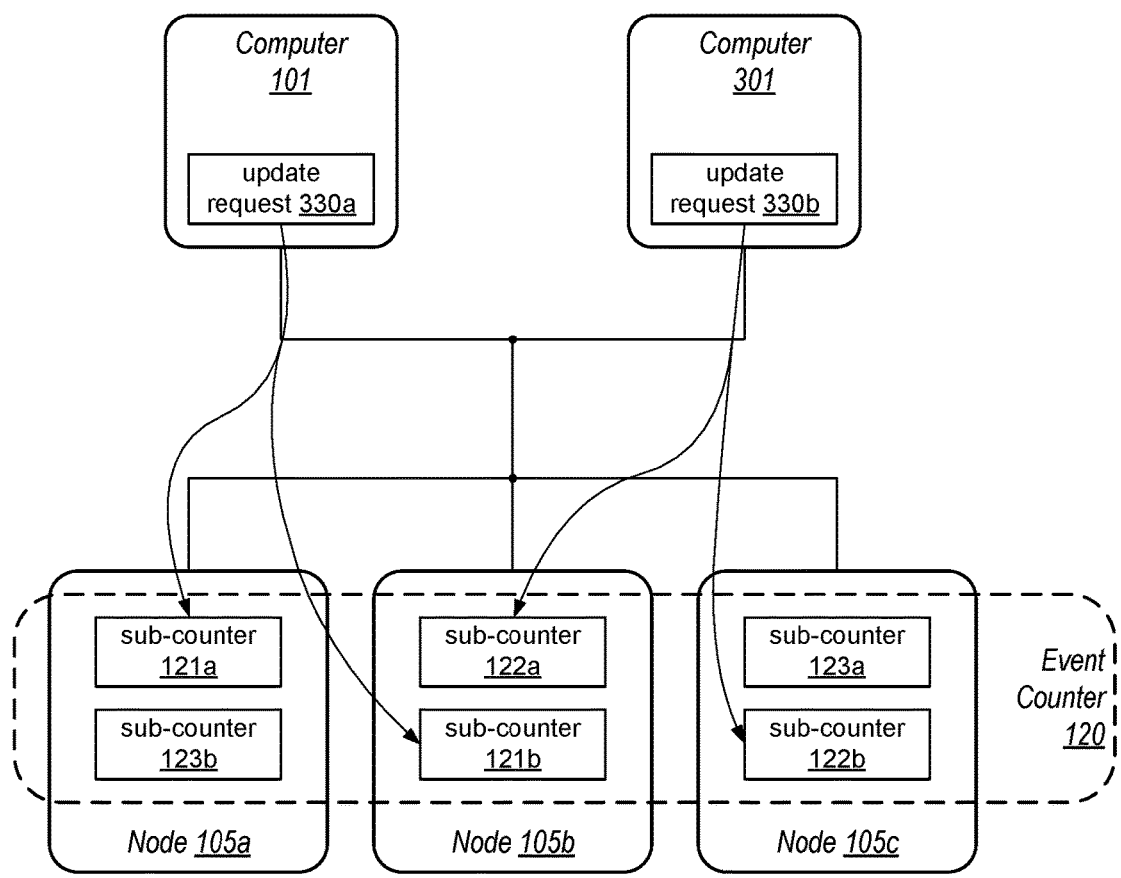
FIG. 3 shows a block diagram of an embodiment of a computer system which includes an event counter implemented on a plurality of nodes in which two computers are capable of updating the event counter.

As discussed above, FIG. 2 illustrates an example of updating an event counter that includes a plurality of sub-counters. In the examples of FIGS. 1 and 2, computer 101 is described as selecting and updating ones of the sub-counter groups. In other embodiments, more than one computer may detect a tracked event, and therefore, select and update a respective one of the sub-counter groups. Turning to FIG. 3, an embodiment of a computer system in which two computers may update a same event counter concurrently is illustrated.

As illustrated in FIG. 3, computer system 100 includes computers 101 and 301, sending respective update requests 330a and 330b to event counter 120 in an overlapping manner. Event counter 120 is implemented as described above for FIG. 1, with a plurality of sub-counter groups 121-123 distributed across nodes 105.

Computers 101 and 301, as shown, may each detect respective occurrences of an event that is tracked by event counter 120. In response to the two occurrences of the event, computer 101 sends update request 330a to sub-counter group 121. Sub-counter group 121 includes sub-counter 121a on node 105a and sub-counter 121b on node 105b. Concurrently, computer 301 sends update request 330b to sub-counter group 122. Sub-counter group 122 includes sub-counter 122a on node 105b and sub-counter 122b on node 105c. The two events may occur in parallel, or substantially close in time to one another, such that computers 101 and 301 send update requests 330a and 330b in a manner resulting in node 105b receiving both update requests 330a and 330b before either is scheduled for processing.

It is noted that, as used herein, "parallel" refers to two or more events occurring in an overlapping manner. Use of the term parallel is not intended to imply that the two or more events begin and/or end at exactly the same time, but rather that at least for a portion of time, the two or more events are active at a same time.

Since, as shown, nodes 105a and 105c each receive a respective one of update requests 330a and 330b, node 105a updates sub-counter 121a while node 105c updates sub-counter 122b. Node 105b, in contrast, receives both of update requests 330a and 330b before either one can be scheduled to be processed. In some embodiments, node 105b may update sub-counters 121b and 122a concurrently. In other embodiments, however, node 105b may arbitrate an order for updating sub-counter 121b and 122a. Any suitable arbitration scheme may be utilized, such as round-robin or least recently used schemes. Based on results of the arbitration, the update for at least one of sub-counters 121b or 122*a* may occur after the updating of sub-counters 121*a* and 122*b* by nodes 105*a* and 105*c*, respectively.

By using replicated copies of each sub-counter of event counter 120, multiple update requests may be processed in parallel with at least one copy of a given sub-counter being updated with little to no delay. In some embodiments, computers 101 and 301 may select the sub-counter group to update without knowledge of which sub-counter group the other computer is selecting. In such embodiments, with three sub-counter groups to select from, two computers will have a 67% chance of not selecting the same sub-counter group. In embodiments in which parallel occurrences of events are not expected to occur often, this percentage may suffice. In other embodiments, such as where parallel occurrences are more likely to occur, computers 101 and 301 may share selection criteria to reduce a likelihood of selecting the same sub-counter group. For example, computers 101 and 301 may each have a sub-counter groups pre-selected before an occurrence of the event. Computers 101 and 301 may share this preselection with each other such that in the event of a same sub-counter group being pre-selected, one of the computers may make an alternate selection.

It is noted that FIG. 3 is merely an example for demonstrating the disclosed concepts. A limited number of elements for describing the concepts have been illustrated. In other embodiments, additional elements may be included, such as different numbers of computers and/or nodes. Other embodiments, may include, for example, network routers and/or switches to support communication between the computers and the nodes.

Figure 4:
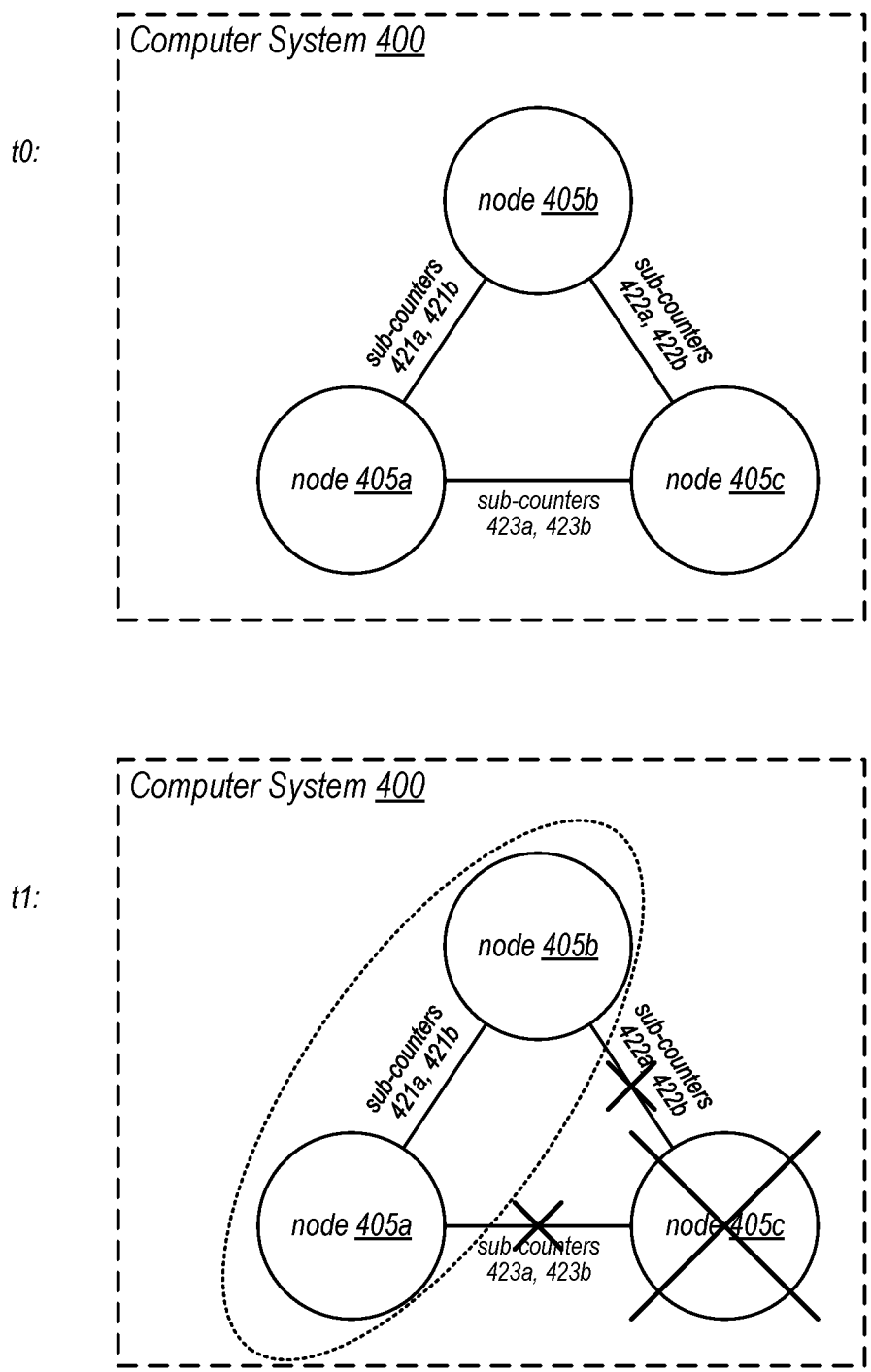
FIG. 4 illustrates an embodiment of a computer system, having sub-counters distributed across three nodes, wherein a node goes offline at one point in time.
Figure 5:
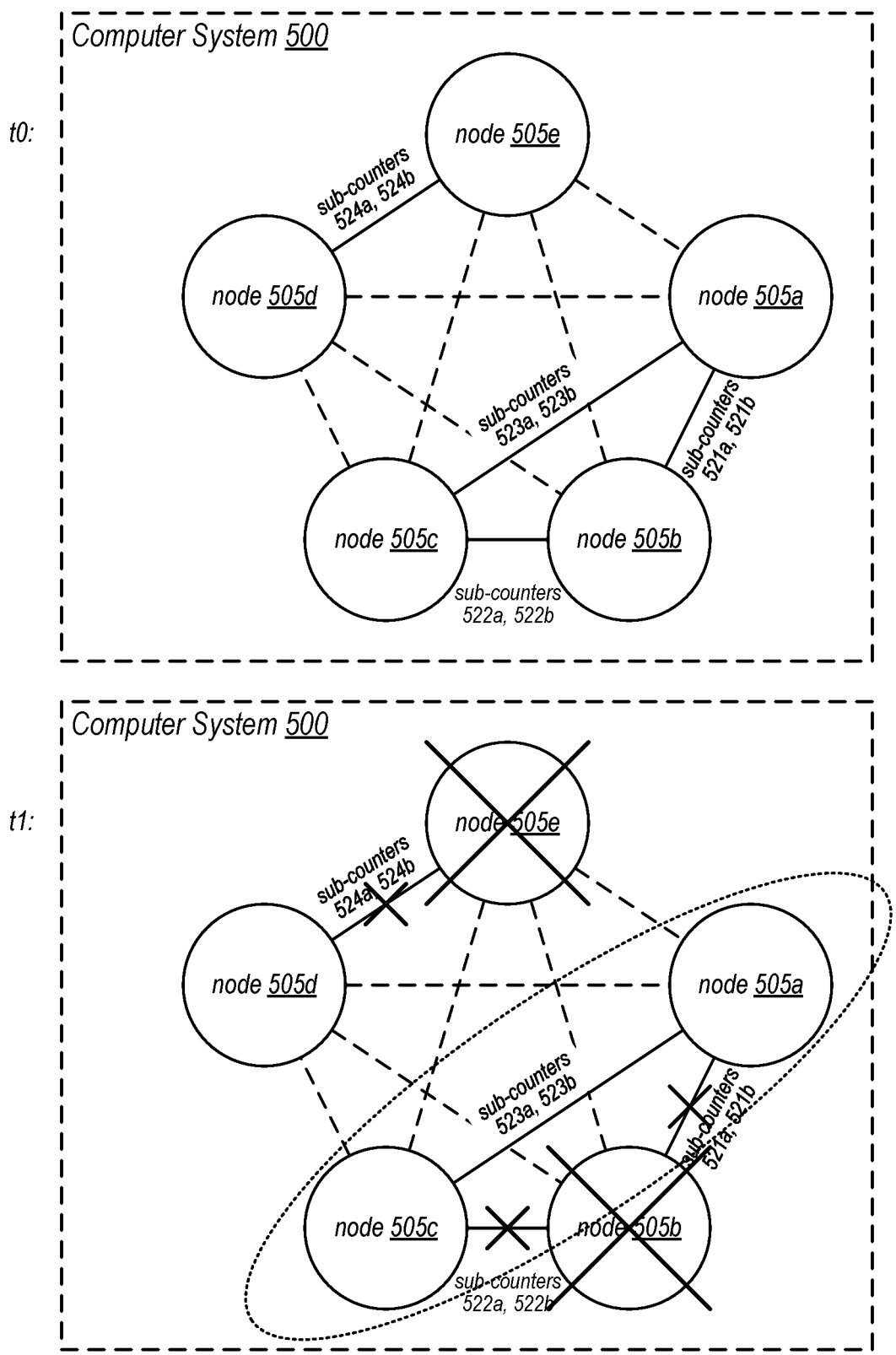
FIG. 5 shows a depiction of a computer system, having sub-counters distributed across five nodes, wherein two nodes go offline at one point in time.
Figure 6:
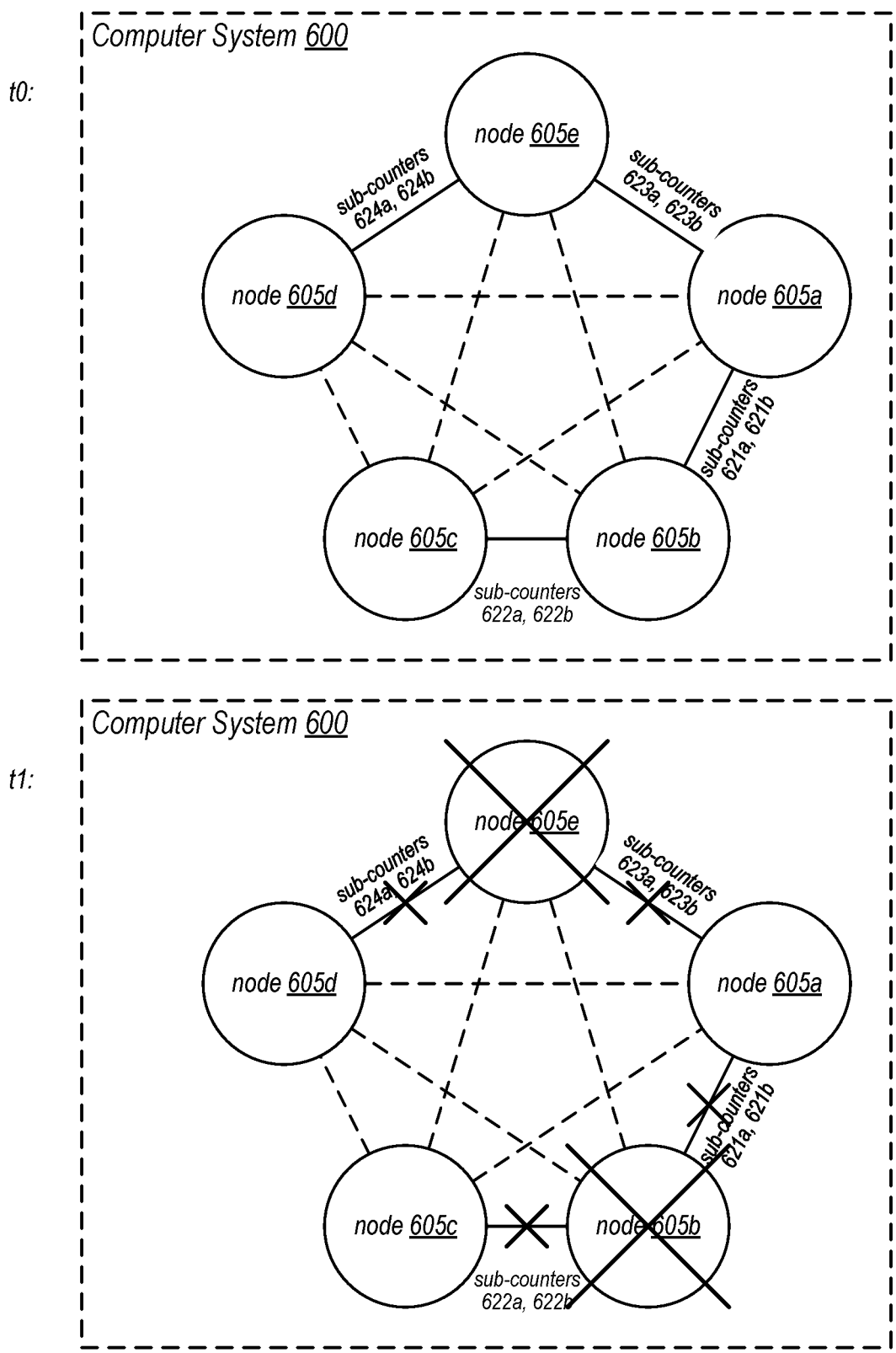
FIG. 6 depicts a different distribution of the sub-counters in the five node computer system of FIG. 5, wherein two nodes go offline at one point in time.

FIGS. 1-3 describe techniques involved in managing a distributed event counter. In the disclosed examples, three sub-counter groups are shown distributed across three nodes. How the sub-counters are distributed, and how many nodes are used for the distribution may determine how robust an event counter may be in response to one or more nodes going offline. FIGS. 4-6 illustrate various examples of distribution of sub-counter groups to the various nodes and their respective tolerances to nodes going offline. In FIG. 4, an example of one of three nodes going offline is presented. In FIGS. 5 and 6, two examples of two of five nodes going offline is shown.

Proceeding to FIG. 4, an example demonstrating distribution of sub-counters across three nodes is depicted. Computer system 400 includes sub-counter groups 421-423 distributed across nodes 405*a*-405*c* (collectively nodes 405). Computer system 400 is shown at two different points in time, t0 when all three nodes 405 are online and time t1 when node 405*c* is offline.

As illustrated, computer system 400 includes an event counter that is implemented using sub-counter groups 421-423. The sub-counters for sub-counter groups 421-423 are placed on different sets of nodes 405 such that a given sub-counter group 421-423 is placed on a different combination of nodes 405 than the other sub-counter groups. As shown, sub-counter group 421 includes sub-counters 421*a* and 421*b* placed on nodes 405*a* and 405*b*, respectively. Similarly sub-counter group 422 includes sub-counters 422*a* and 422*b* placed on nodes 405*b* and 405*c* while sub-counter group 423 includes sub-counters 423*a* and 423*b* placed on nodes 405*a* and 405*c*.

At time t0, all three nodes 405 are online and, therefore, any one of sub-counter groups 421-423 may be selected for an update and both sub-counters included in the group may be updated. At time t1, node 405*c* is taken offline. As previously disclosed, node 405*c* may be taken offline for various reasons, some intentional and some unforeseen. With node 405*c* offline, sub-counter group 421 is the only group in which both sub-counters can be updated. Sub-counter groups 422 and 423 each include one sub-counter on node 405*c*, and therefore, these sub-counters cannot be updated. Selecting either sub-counter group 422 or 423 would result in only one sub-counter for either group being updated, thereby eliminating the redundancy that is desired for each occurrence of a tracked event.

In addition, since one sub-counter from each of sub-counter group 422 and 423 remains accessible on nodes 405*a* and 405*b*, an accurate count value for the event counter can be determined, without missing any of the events that had previously been counted. By using three nodes, computer system 400 may support event counters that are tolerant of one node going offline.

Moving now to FIG. 5, an example demonstrating distribution of sub-counters across five nodes is illustrated. Computer systems 500 depicts how four sub-counter groups may be distributed across five nodes. Computer system 500 includes sub-counter groups 521-524 distributed across nodes 505*a*-505*e* (collectively nodes 505). In a similar manner as FIG. 4, computer system 500 is shown at two different points in time, t0 when all five nodes 505 are online and time t1 when nodes 505*b* and 505*e* are offline.

As shown, computer system 500 includes an event counter that is implemented using sub-counter groups 521-524. It is noted that only four sub-counter groups are used with the five nodes 505. The sub-counters for sub-counter groups 521-523 are placed on nodes 505*a*-505*c* in a similar manner as sub-counter groups 421-423 are distributed across nodes 405. In addition, sub-counter group 524 includes sub-counters 524*a* and 524*b* that are placed on nodes 505*d* and 505*e*, respectively.

At time t0, all five nodes 505 are online and any one of sub-counter groups 521-524 may be selected for an update in which both sub-counters included in the selected group may be updated. At time t1, nodes 505*b* and 505*e* are taken offline, for reasons as described above. With nodes 505*b* and 505*e* offline, sub-counter group 523 is the only group in which both sub-counters can be updated. Sub-counter groups 521 and 522 each include one sub-counter on node 505*b*, while sub-counter group 524 includes a sub-counter on node 505*e*. Selecting any of sub-counter groups 521, 522, or 524 would result in only one sub-counter for the selected group being updated, eliminating the desired redundancy.

As shown, since one sub-counter from each of sub-counter groups 521, 522, and 524 remains accessible on nodes 505*a*, 505*c*, and 505*d*, an accurate count value for the event counter can be determined, without missing any of the events that had previously been counted. It is noted however, that, depending on which two ones of nodes 505 go offline, cases may occur during which a sub-counter from all groups is not accessible. For example, if nodes 505*d* and 505*e* both go offline, then no sub-counter from sub-counter group 524 will be available. This may be mitigated by increasing redundancy from two copies of each sub-counter to three copies of each sub-counter, each copy on a different node.

Use of three nodes may allow computer system 400 to support event counters that are tolerant of one node going offline. Use of five nodes may allow computer system 500 to support event counters that are tolerant of two nodes going offline. To support a particular number of nodes going offline concurrently, the placing of the sub-counters of the plurality of sub-counter groups may include placing the sub-counter groups such that for a given number of 'n' nodes in the plurality of nodes, the event counter is capable of being modified and read without loss of count data for up to (n−1)/2 nodes going offline.

FIG. 5 describes an example of distributing sub-counters across five nodes in a computer system to support two of five nodes going offline. Turning now to FIG. 6, a different example of distributing sub-counters across five nodes in a computer system is depicted. The example of FIG. 6 illustrates how a distribution of sub-counters may not support two of five nodes going offline.

FIG. 6, includes computer systems 600 which depicts a distribution of four sub-counter groups across five nodes that may not support a desired level of redundancy. Computer system 600 includes sub-counter groups 621-624 distributed across nodes 605a-605e (collectively nodes 605). In a similar manner as FIGS. 4 and 5, computer system 600 is shown at two different points in time, t0 when all five nodes 605 are online and time t1 when nodes 605b and 605e are offline.

Computer system 600, in a similar manner as computer system 500, implements an event counter using sub-counter groups 621-624. In contrast to computer system 500, sub-counter group 621 is implemented on nodes 605a-605b, sub-counter group 622 on nodes 605b and 605c, sub-counter group 623 on nodes 605a and 605e, and sub-counter group 624 on nodes 605d and 605e.

At time t0, all five nodes 605 are online and any one of sub-counter groups 621-624 may be selected for an update in which both sub-counters included in the selected group may be updated. At time t1, nodes 605b and 605e are taken offline, for reasons as described above. With nodes 605b and 605e offline, no sub-counter groups remain in which both sub-counters can be updated. Node 605a includes a sub-counter from each of sub-counter groups 621 and 623, node 605c includes one sub-counter from sub-counter group 622 and node 605d includes one sub-counter from sub-counter group 624. Accordingly, no sub-counter group can be updated with the desired redundancy.

It is noted that FIGS. 4-6 are merely examples. Only elements for demonstrating the concepts have been illustrated. In other embodiments, additional elements may be included, such as different numbers of nodes than the 3 and 5 shown.

As discussed above, FIGS. 1 and 3 illustrate computer systems that include a single event counter distributed across a plurality of nodes. In some cases, tracking of more than one event may be desired. In other cases, multiple event counters may be updated for one occurrence of a tracked even. For example, in the case of tracking events related to an email server, reception of a new email may result in updates to event counters tracking total emails on the server, total unread emails on the server, total emails for the specific recipient(s), unread emails for the recipients, and the like. Similarly, for event counters tracking database statistics, deletion of a database record may result in updates to event counters tracking total number of active records, number of records deleted, number of records modified, number of records accessed, and so forth.

Figure 7:
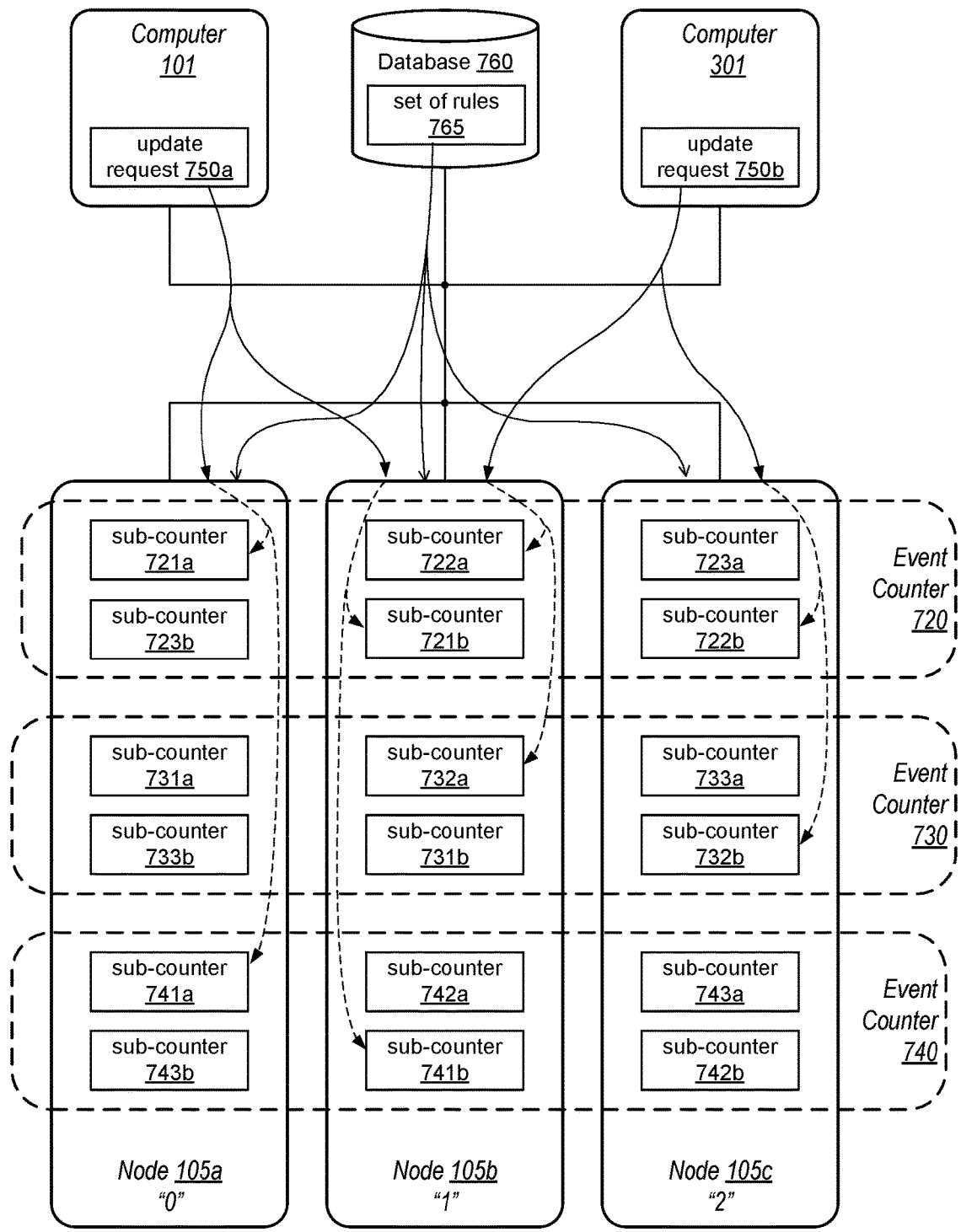
FIG. 7 a block diagram of an embodiment of a computer system which includes a plurality of event counters implemented on a plurality of nodes in which two computers are capable of updating the event counters.

Proceeding now to FIG. 7, an embodiment of a computer system on which a plurality of event counters are implemented is shown. FIG. 7 depicts a computer system that includes a plurality of event counters distributed across a plurality of nodes. In the illustrated embodiment, computer system 100 includes computers 101 and 301, as well as nodes 105. As shown, three event counters are implemented in nodes 105, event counters 720, 730, and 740. Event counter 720 includes sub-counter groups 721, 722, and 723, event counter 730 includes sub-counter groups 731, 732, and 733, and event counter 740 includes sub-counter groups 741, 742, and 743.

As illustrated, computer system 100 includes nodes 105, computers 101 and 301. Computer 101 may be configured to implement event counters 720, 730, and 740 that each have a respective plurality of sub-counter groups. Ones of the respective sub-counter groups are implemented on different ones of the plurality of nodes. As shown, node 105a includes a respective sub-counter from each of sub-counter groups 721 and 723 of event counter 720, sub-counter groups 731 and 733 of event counter 730, and sub-counter groups 741 and 743 of event counter 740. Similarly, node 105b includes a respective sub-counter from each of sub-counter groups 721 and 722 of event counter 720, sub-counter groups 731 and 732 of event counter 730, and sub-counter groups 741 and 742 of event counter 740. In a like manner, node 105c includes a respective sub-counter from each of sub-counter groups 722 and 723 of event counter 720, sub-counter groups 732 and 733 of event counter 730, and sub-counter groups 742 and 743 of event counter 740. It is noted that each of nodes 105 includes sub-counters from the same sub-counter groups for each event counter.

To implement the plurality of event counters, computer 101 may be further configured to assign an index value to respective ones of the plurality of sub-counter groups, the index value indicating which of nodes 105 include sub-counter values of the selected sub-group. For example, computer 101 may assign respective values to each of nodes 105, such as, node 105a assigned the value "0," node 105b assigned the value "1," and node 105c assigned the value "2." Using this assignment, sub-counter groups 721, 731, and 741 that are each distributed on nodes 105a and 105b, are each assigned the index [0,1]. Similarly, sub-counter groups 722, 732, and 742 that are each distributed on nodes 105b and 105c, are each assigned the index [1,2]. Following this convention, sub-counter groups 723, 733, and 743 that are each distributed on nodes 105a and 105c, are each assigned the index [0,2]. It is noted that all three of event counters 720, 730, and 740 include respective sub-counter groups that have the same set of indexes.

In response to an occurrence of an event, computer 101 may be further configured to select a particular sub-counter group to update. As illustrated, computer 101 may select the particular sub-counter group to update without selecting a particular event counter to update. For example, computer 101 may select a particular index value to update, such as [0,1], corresponding to any one of sub-counter groups 721, 731, and 741 that are implemented across nodes 105a and 105b.

After selecting the particular sub-counter group to update, computer 101 may be further configured to send update request 750a to nodes 105a and 105b associated with the particular sub-counter group index [0,1]. To send this update request, computer 101 may be further configured to send the index value of the selected sub-group and to exclude an indication of which of event counters 720, 730, and 740 to update. For example, computer 101 may send an update request that includes sub-counter group index value [0,1] without any indication of a particular event counter to update. Instead, computer 101 may send, as part of update request 750a or separately, one or more details of the event occurrence. Computer 101 sends update request 750a and any associated details to nodes 105a and 105b that correspond to index [0,1].

As illustrated, nodes 105a and 105b may be configured to receive update request 750a from computer 101, and to determine, based on set of rules 765, which of the plurality of event counters to update in response to update request 750a. Set of rules 765 may include one or more rules that identify particular ones of event counters 720, 730, and 740 to update based on details of a given event that occurs. Using a transaction server as an example, a rule for event counter 720 may state that event counter 720 tracks a total number of transactions occurring and is, therefore, updated in response to any transaction. A rule for event counter 730 may state that event counter 730 tracks transactions occurring between two personal accounts and is updated in response to transactions in which a sender and a receiver of the transaction both used accounts indicated as personal. A rule for event counter 740 may state that event counter 740 tracks transactions involving business accounts and is updated in response to transactions in which either a sender or a receiver of the transaction used an accounts indicated as business. In the example, the particular event associated with update request 750a is determined to involve at least one business account. Accordingly, nodes 105a and 105b may each determine to update event counters 720 and 740.

As shown, nodes 105a and 105b may be further configured, in response to this determination, to modify sub-counter groups 721 and 741, corresponding to event counters 720 and 740, respectively. Since the rule for event counter 730 is not satisfied by the particular event, sub-counter group 731 is not updated. In addition, sub-counters associated with sub-counter groups other than 721 and 741 are not updated due to those sub-counters not corresponding to the received index of [0,1].

Nodes 105 may be configured to retrieve set of rules 765 from database 760 in response to any suitable trigger, such as booting. Nodes 105 may be further configured to poll database 760 for an updated set of rules 765 after a particular amount of time has elapsed from the booting. Using such an update process, rules for updating the various event counters may be updated as necessary without interruption to the event counting process.

In a manner similar as described in regards to FIG. 3, computers 101 and 301 may be capable of sending update requests concurrently. For example, if computer 301 determines an occurrence of an event corresponding to update request 750b, computer 301 may select a different index than computer 101 used for update request 750a. Accordingly, computer 301 may be configured to select index [1,2] while computer 101 has index [0,1] selected. Computer 301 is configured to send update request 750b to nodes 105b and 105c that correspond to index [1,2]. As shown, the event associated with update request 750b includes a transaction between two personal accounts. Based on set of rules 765, nodes 105b and 105c update sub-counter groups 722 and 732 in response to use of index [1,2].

As illustrated, computers 101 and 301 may be further configured, in response to determining that a particular node of nodes 105 is unavailable (e.g., node 105c), to eliminate from selection, sub-counter groups having an index value corresponding to node 105c, e.g., index values [0,2] and [1,2]. Accordingly, while node 105c is offline, computers 101 and 301 may only use index value [0,1].

The above descriptions may apply when nodes 105 are configured to utilize the set of rules 765. In other embodiments, nodes 105 may not use set of rules 765, and instead, may require an indication of which ones of event counters 720, 730, and 740 to update. In these other embodiments, computers 101 and 301 may select a respective sub-counter group associated with one or more particular event counters to be updated. In such embodiments, computers 101 and 301 may use the set of rules 765.

It is noted that FIG. 7 is an example for demonstrating the disclosed concepts. A limited number of elements for describing the concepts are shown. In other embodiments, additional elements may be included, such as different numbers of computers and/or nodes. Although three event counters are shown, any suitable number of event counters may be included in the computer system and distributed across the included nodes.

FIGS. 1-7 describe systems and techniques for managing event counters that are tolerant of one or more nodes going offline. These techniques may be implemented using a variety of methods. These techniques may include, for example, updating a set of sub-counters of an event counter across a plurality of nodes, managing an event counter when a node becomes unavailable, managing multiple concurrent updates of an event counter, and updating a plurality of associated event counters in response to a single occurrence of an event. The following figures, FIGS. 8-11, depict four methods that may be utilized for implementing such techniques.

Proceeding now to FIG. 8, a flow diagram of an embodiment of a method for managing an event counter that includes a plurality of sub-counters is illustrated. In some embodiments, method 800 may be performed by computer 101 of computer system 100 in FIG. 1. Computer 101 may, for example, include (or have access to) a non-transitory, computer-readable medium having program instructions stored thereon that are executable by the computer to cause the operations described with reference to FIG. 8. Referring collectively to FIG. 1 and method 800, the method begins in block 810.

At block 810, method 800 includes initializing, by computer 101 in computer system 100, event counter 120 that includes a plurality of sub-counter groups 121-123, each plurality of sub-counter groups 121-123 including at least two sub-counters located on different nodes of a plurality of nodes 105 in computer system 100. As illustrated, each of sub-counter groups 121-123 includes at least two sub-counters (indicated by 'a' and 'b' labels) located on different ones of nodes 105, such that no two nodes 105 include a set of sub-counters from the same sub-counter groups. Node 105a includes sub-counters from groups 121 and 123, node 105b includes sub-counters from groups 121 and 122, and node 105c includes sub-counters from groups 122 and 123.

Method 800 also includes at block 820, in response to an occurrence of an event associated with event counter 120, computer 101 performing two operations to update event counter 120. A first operation, block 830, includes selecting a particular sub-counter group of sub-counter groups 121-123 to update. For each occurrence of an associated event, event counter 120 is updated by updating one sub-counter group of the plurality of sub-counter groups, e.g., sub-counter group 121. A particular sub-counter group may be selected using any suitable technique, such as round robin or least recently used group. In some embodiments, computer 101 may select a sub-counter group that is included on nodes 105 that currently have a highest available bandwidth.

Block 820 further includes block 840, which includes sending, to sub-counters corresponding to sub-counter group 121, update request 130 to update a sub-counter value for sub-counter group 121. After sub-counter group 121 has been selected for the update, computer 101 generates update request 130 which includes a particular type of update. For example, a given update may include incrementing or decrementing the current sub-counter value by a particular amount. In some cases, a particular type of event may cause a reset of the sub-counter value to an initial value. Computer 101 sends update request to all nodes that include one of the sub-counters of sub-counter group 121, in this example, nodes 105a and 105b.

At block 850, method 800 also includes outputting, by computer 101 in response to a request for a current count value of event counter 120, a sum of the sub-counter values for sub-counter groups 121-123 as current count value 135. To determine current count value 135 of event counter 120, one sub-counter from each sub-counter group 121-123 is read and the read count values are totaled. It is noted that, in the illustrated example, only two nodes 105 may be accessed in order to read one sub-counter from each of the three sub-counter groups 121-123. For example, nodes 105b and 105c may be accessed in order to read sub-counter 121b, 122a, and 123a. Alternatively, sub-counter 122b may be read instead of 122a. Selection of which nodes 105 to access in order to generate current count value 135 may be arbitrary, use a round robin or least recently used technique, or be selected based on current available bandwidth. The method may end at block 850.

It is noted that the method of FIG. 8 includes elements 810-850. Method 800 may be repeated in response to a subsequent occurrence of the tracked event, for example, returning to block 820. In some cases, different instances of method 800 may be active and performed concurrently. For example, computer 101 may include multiple processor cores, allowing two or more processor cores to perform respective instances of method 800, independently from one another, in order to maintain two or more different event counters. For example, a different instance of method 800 may, in some embodiments, may be performed to distribute a different plurality of sub-counter groups associated with a different event counter across the plurality of nodes 105. In response to the occurrence of the event or a different event associated with the different event counter, a sub-counter value of a selected one of the different plurality of sub-counter groups is updated.

Figure 9:
FIG. 9 shows a flow diagram of an embodiment of a method for managing an event counter when a node that includes sub-counters of the event counter becomes unavailable.

Moving to FIG. 9, a flow diagram of an embodiment of a method for managing the event counter when a particular node is unavailable is shown. In a similar manner as method 800, method 900 may, in some embodiments, be performed by computer 101 in FIG. 1. Computer 101 may, for example, include (or have access to) a non-transitory, computer-readable medium having program instructions stored thereon that are executable by computer 101 to cause the operations described with reference to FIG. 9. Referring collectively to FIG. 1 and method 900 in FIG. 9, the method begins in block 910.

Method 900 at block 910 includes determining, by computer 101, that a particular node of the plurality of nodes 105 is unavailable, wherein the particular node includes a sub-counter from at least one sub-counter group. For example, node 105a may be taken offline for various reasons, such as for maintenance (defragmentation of a hard-disk drive, garbage collection of deleted files on node 105a, etc.) or due to an unexpected power failure on node 105a (a power cord is disconnected, a fuse is blown, and the like), or other reasons that result in node 105a being inaccessible. As shown in FIG. 1, node 105a includes sub-counters 121a and 123b, from sub-counter groups 121 and 123, respectively.

At block 920, method 900 further includes, while node 105a is unavailable, eliminating from selection for updating the at least one sub-counter group. To support redundancy, at least two sub-counters should be updated in response to a given update request from computer 101. When node 105a is unavailable, only sub-counters 121b and 123a are available for sub-counter groups 121 and 123. Accordingly, sub-counter groups 121 and 123 are not included in the selection process while node 105a is offline. Sub-counter group 122, therefore, is the only sub-counter group with both sub-counters available while node 105a is offline. Method 900 may end in block 920.

It is noted that operations may move to a different method, such as method 800, after method 900 is performed. For example, operations may move to block 820 in response to a subsequent occurrence of the tracked event after method 900 ends. In a similar manner as method 800, different instances of method 900 may be performed concurrently, for example, if node 105a includes sub-counters from a different event counter.

Figure 10:
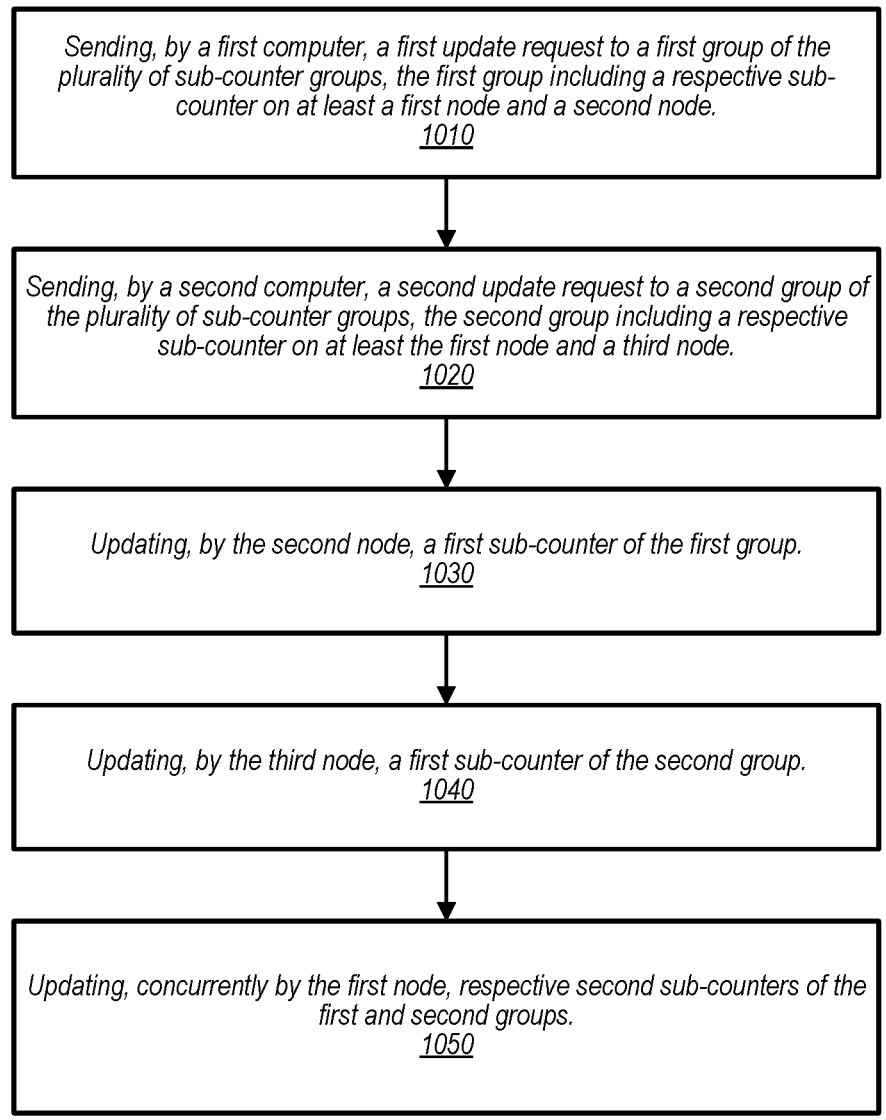
FIG. 10 depicts a flow diagram of an embodiment of a method for managing multiple updates for sub-counters of an event counter.

Turning to FIG. 10, a flow diagram of an embodiment of a method for managing update requests from two different computers in a computer system is illustrated. Method 1000 may be performed by computer system 100 in FIG. 3. Computer system 100 may include (or have access to) a non-transitory, computer-readable medium having program instructions stored thereon that are executable by computers 101 and 301 to cause the operations described with reference to FIG. 10. Referring collectively to FIGS. 3 and 10, method 1000, in response to two occurrences of an event associated with the event counter, begins in block 1010.

Method 1000 at block 1010 includes sending, by computer 101, update request 330a to sub-counter group 121 of the plurality of sub-counter groups 121-123, sub-counter group 121 including sub-counter 121a on node 105a and sub-counter 121b on node 105b. The particular type of event that event counter 120 is used to track may occur on, and/or be detectable by, different computers (e.g., 101 and 301) in computer system 100. For example, event counter 120 may be used to track modified records in a particular database.

At block 1020, method 1000 further includes sending, by computer 301 in computer system 100, update request 330b to sub-counter group 122 of the plurality of sub-counter groups 121-123, sub-counter group 122 including sub-counter 122a on node 105b and sub-counter 122b on node 105c. Both computers 101 and 301 may access the database and, therefore, be capable of detecting respective accesses of records, resulting in update requests 330a and 330b from computers 101 and 301. Computers 101 and 301 may send update requests 330a and 330b at a same point in time or in a short enough succession that neither update request begins processing on node 105b before the other one is received.

Block 1030 of method 1000 also includes updating, by node 105a, sub-counter 121a of sub-counter group 121. Since node 105a only receives update request 330a, node 105a may process update request 330a after it has been received.

Method 1000 at block 1040 further includes updating, by node 105c, sub-counter 122b of sub-counter group 122. In a similar manner as in block 1030, node 105c only receives update request 330b, thereby allowing node 105c to process update request 330b after its reception.

At block 1050, method 1000 further includes updating, concurrently by node 105b, sub-counters 121b and 122a. If node 105b receives both update requests 330a and 330b before either one is scheduled to be performed, then node 105b may be capable of performing a concurrent update of both sub-counters. In other embodiments, however, node 105b may only be capable of performing one sub-counter update at a time, and may, therefore, perform an arbitration operation in order to determine which update request is scheduled first. Any suitable arbitration technique may be utilized. Due to delays associated with arbitration, the update for at least one of sub-counters 121*b* and 122*a* may occur after the updating of sub-counters 121*a* and 122*b* by nodes 105*a* and 105*c*, respectively. The method may end in block 1050.

As discussed above, the method of FIG. 10 includes elements 1010-1050. Method 1000, or a portion thereof, may be repeated in response to additional update requests being sent by computer 101, 301, and other computers included in computer system 100. For example, computers 101 and 301 may send subsequent update requests 330*c* and 330*d* (not illustrated) in response to detecting respective events associated with event counter 120. If one of nodes 105 receives both update requests 330*c* and 330*d* before either is scheduled, then method 1000 may be repeated to manage the reception of the two requests.

Figure 11:
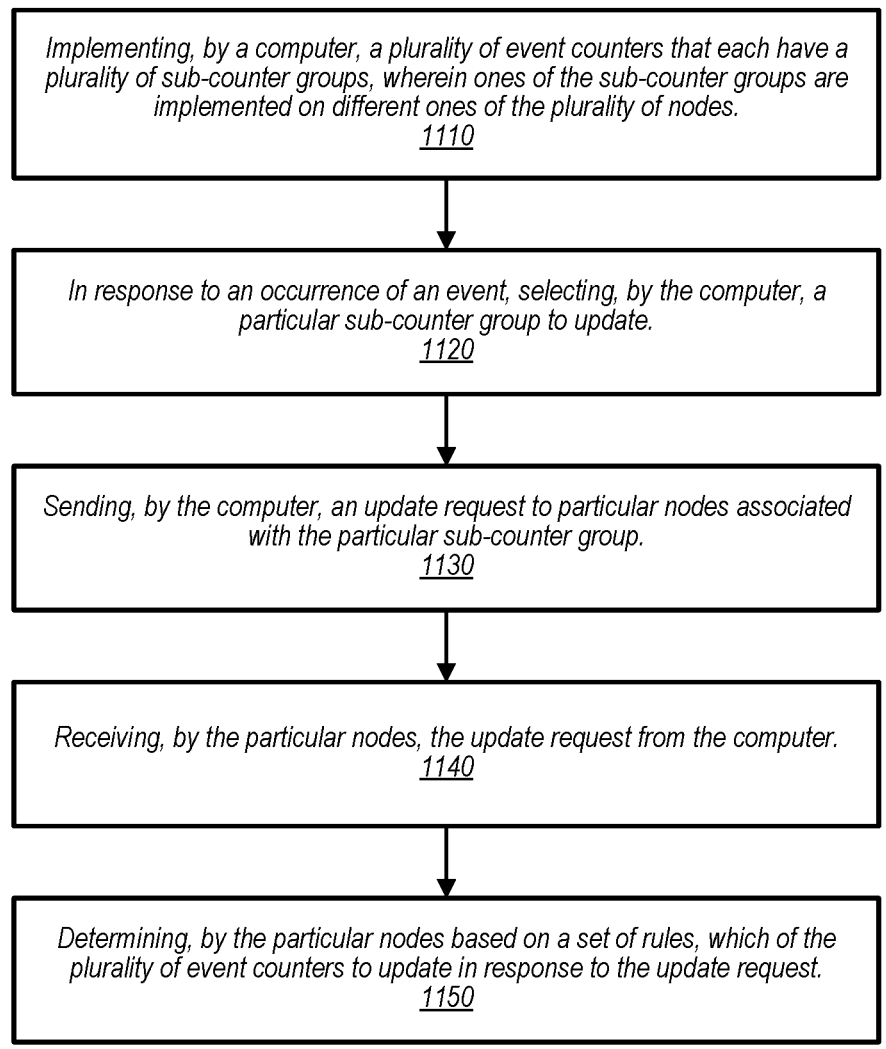
FIG. 11 illustrates a flow diagram of an embodiment of a method for updating respective sets of sub-counters for a plurality of event counters.

Proceeding to FIG. 11, a flow diagram of an embodiment of a method for managing a plurality of event counters related to associated events is shown. In a similar manner as previously described, method 1100 may, in some embodiments, be performed by computer system 100 of FIGS. 1, 3, and 7. Elements in computer system 100 may, for example, include (or have access to) a non-transitory, computer-readable medium having program instructions stored thereon that are executable by computers 101 and 301, and/or by nodes 105, to cause the operations described with reference to FIG. 11. Referring collectively to FIG. 7 and method 1100 in FIG. 11, the method begins in block 1110.

Method 1100 at block 1110 includes implementing, by computer 101, event counters 720, 730, and 740 that each have a plurality of sub-counter groups. As illustrated, computer 101 may distribute ones of the sub-counter groups on different ones of nodes 105. For example, node 105*a* may include a respective sub-counter from each of sub-counter groups 721 and 723 of event counter 720, sub-counter groups 731 and 733 of event counter 730, and sub-counter groups 741 and 743 of event counter 740. In a similar manner, node 105*b* may include a respective sub-counter from each of sub-counter groups 721 and 722 of event counter 720, sub-counter groups 731 and 732 of event counter 730, and sub-counter groups 741 and 742 of event counter 740. Furthermore, node 105*c* may include a respective sub-counter from each of sub-counter groups 722 and 723 of event counter 720, sub-counter groups 732 and 733 of event counter 730, and sub-counter groups 742 and 743 of event counter 740. It is noted that each of nodes 105 includes sub-counters from the same sub-counter groups for each event counter, and that no two nodes include a same combination of sub-counter groups.

At block 1120, method 1100 further includes selecting, by computer 101 in response to an occurrence of an event, a particular sub-counter group to update. Computer 101 may select sub-counter group "01" to update. As shown, sub-counter group "01" refers to the three sub-counter groups that include respective sub-counters on nodes 105*a* and 105*b*, such as sub-counter groups 721, 731, and 741, corresponding to event counters 720, 730, and 740, respectively. Computer 101, however, does not select a particular one of event counters 720, 730, and 740.

At block 1130, method 1100 also includes sending, by computer 101, update request 750*a* to nodes 105*a* and 105*b* associated with the particular sub-counter group "01." Computer 101, as illustrated, may generate update request 750*a* based on the selected group "01" and may further include one or more details associated with the occurrence of the event. For example, events associated with event counters 720, 730, and 740 may include various activities associated with a database (e.g., database 760, or a different database in computer system 100). The particular occurrence of the event may be a deletion of a record. Details associated with the occurrence may include a particular record that was deleted, an identity of a user that performed the deletion, a time stamp indicative of when the record was deleted, whether the record had been modified or copied before deletion, and other similar details.

Method 1100 also includes, at block 1140, receiving by nodes 105*a* and 105*b*, update request 750*a* from computer 101. Nodes 105*a* and 105*b*, associated with sub-counter group "01," may receive update request 750*a*, including any details that computer 101 included in the request. Each of nodes 105*a* and 105*b* may include one or more processor circuits capable of decoding update request 750*a* to determine what type of update is requested and to extract the included details.

At block 1150, method 1100 further includes determining, by nodes 105*a* and 105*b* based on set of rules 765, which of event counters 720, 730, and 740 to update in response to update request 750*a*. Nodes 105 may, in response to a boot process and/or a reset sequence, retrieve set of rules 765 from database 760. As previously described, set of rules 765 may include one or more rules that provide a mapping of particular event details to one or more event counters to be updated when the particular event details are indicated. For example, update request 750*a* may include details such as the deletion of a record by a user at a particular IP address. One rule of set of rules 765 may indicate that event counter 720 is updated in response to a deletion of a record. A different rule of set of rules 765 may indicate that event counter 740 is updated in response to an addition, deletion, or modification of a record by a user at the particular IP address. Based on these rules, node 105*a* may update sub-counters 721*a* and 741*a*, while node 105*b* similarly updates sub-counters 721*b* and 741*b*. The method may end in block 1150.

As discussed above, the method of FIG. 11 includes elements 1110-1150. Method 1100 may be repeated in response to a subsequent occurrence of the tracked event, for example, returning to block 1120. In a similar fashion as described for methods 800-1000, multiple instances of method 1100 may be performed concurrently. For example, computer 301 may, in response to an occurrence of a different event, perform a different instance of method 1100 to send update request 750*b* while update request 750*a* is being processed.

It is further noted that operations of methods 800-1100 may be performed concurrently and/or sequentially. For example, operations of method 900 may be performed in response to a particular node going offline while the operations of method 1100 are in process. It is further noted that any or all of methods 800-1100 may be performed in an automated fashion without user input.

Figure 12:
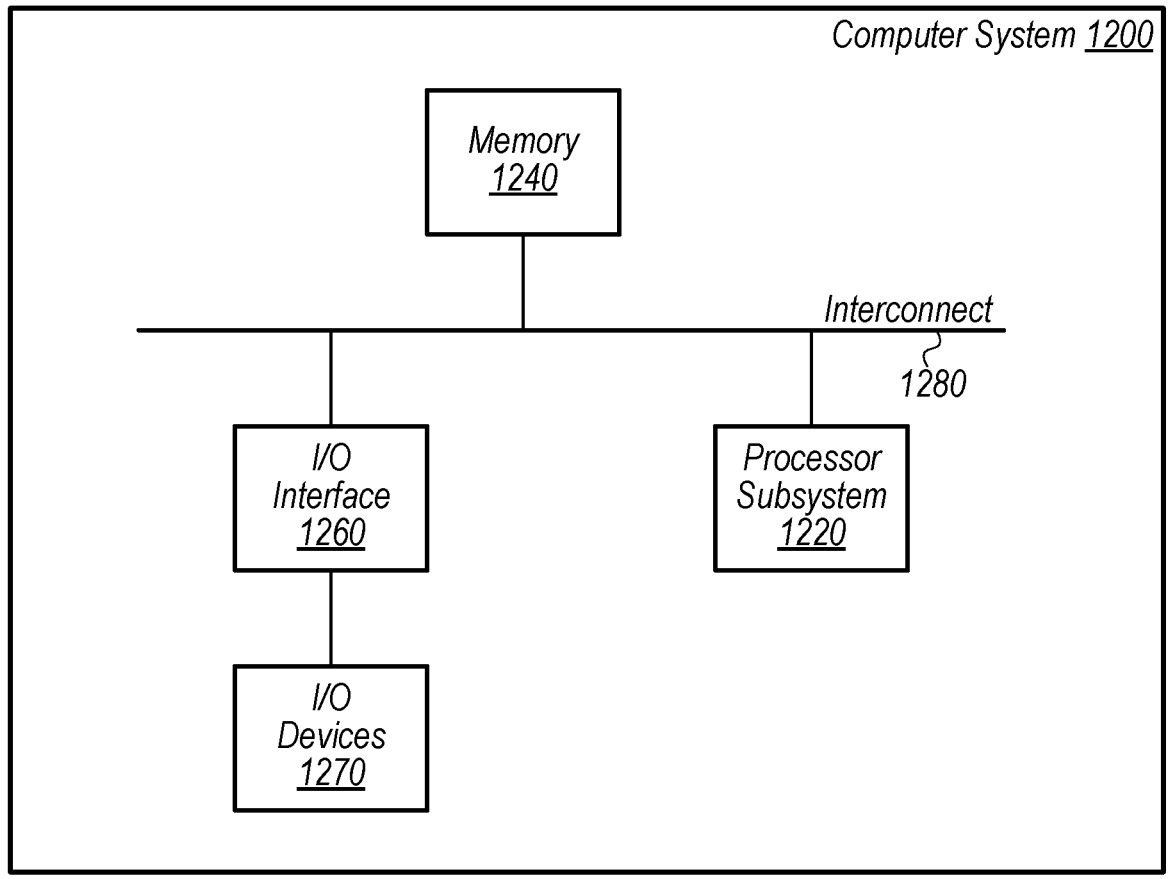
FIG. 12 is a block diagram illustrating an example computer system, according to some embodiments.

Referring now to FIG. 12, a block diagram of an example computer system 1200 is depicted. Computer system 1200 may, in various embodiments, implement disclosed computers, such as computers 101 and 301 and/or nodes 105 as illustrated in FIGS. 1, 3, and 7. Computer system 1200 includes a processor subsystem 1220 that is coupled to a system memory 1240 and I/O interfaces(s) 1260 via an interconnect 1280 (e.g., a system bus). I/O interface(s) 1260 is coupled to one or more I/O devices 1270. Computer system 1200 may be implemented using any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, etc. Although a single computer system 1200 is shown in FIG. 12 for convenience, computer system 1200 may also be implemented as two or more computer systems operating together.

Processor subsystem 1220 may include one or more processors or processing units. In various embodiments of computer system 1200, multiple instances of processor subsystem 1220 may be coupled to interconnect 1280. In various embodiments, processor subsystem 1220 (or each processor unit within 1220) may contain a cache or other form of on-board memory.

System memory 1240 is usable to store program instructions executable by processor subsystem 1220 to cause computer system 1200 perform various operations described herein. System memory 1240 may be implemented using different physical, non-transitory memory media, such as hard disk storage, floppy disk storage, removable disk storage, flash memory, random access memory (RAM-SRAM, EDO RAM, SDRAM, DDR SDRAM, LPDDR SDRAM, etc.), read-only memory (PROM, EEPROM, etc.), and so on. Memory in computer system 1200 is not limited to primary storage such as system memory 1240. Rather, computer system 1200 may also include other forms of storage such as cache memory in processor subsystem 1220 and secondary storage on I/O devices 1270 (e.g., a hard drive, storage array, etc.). In some embodiments, these other forms of storage may also store program instructions executable by processor subsystem 1220.

I/O interfaces 1260 may be any of various types of interfaces configured to couple to and communicate with other devices, according to various embodiments. In one embodiment, I/O interface 1260 is a bridge chip (e.g., Southbridge) from a front-side to one or more back-side buses. I/O interfaces 1260 may be coupled to one or more I/O devices 1270 via one or more corresponding buses or other interfaces. Examples of I/O devices 1270 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1270 includes a network interface device (e.g., configured to communicate over WiFi, Bluetooth, Ethernet, etc.), and computer system 1200 is coupled to a network via the network interface device.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A method, comprising:
   initializing, by a computer included in a computer system, an event counter that includes a plurality of sub-counter groups, each plurality of sub-counter groups including at least two sub-counters located on different nodes of a plurality of nodes in the computer system;
   in response to an occurrence of an event associated with the event counter:
      selecting, by the computer, a particular sub-counter group of the plurality of sub-counter groups to update; and
      sending, by the computer to at least two sub-counters located on different nodes and included in the particular sub-counter group, a request to concurrently update respective copies of a sub-counter value for the particular sub-counter group; and
   in response to a request for a current count value of the event counter, outputting a sum of the sub-counter values for the plurality of sub-counter groups as the current count value.

2. The method of claim 1, wherein outputting the sum includes:
   accessing two or more, but less than all, of the plurality of nodes; and
   reading at least one sub-counter value from respective sub-counters of the plurality of sub-counter groups on the accessed nodes.

3. The method of claim 1, further comprising:
   determining that a particular node of the plurality of nodes is unavailable, wherein the particular node includes a respective sub-counter from at least one sub-counter group; and
   while the particular node is unavailable, eliminating from selection for modification the at least one sub-counter group.

4. The method of claim 1, further comprising:
   in response to two occurrences of an event associated with the event counter:
      sending, by a particular computer in the computer system, a first update request to a first group of the plurality of sub-counter groups, the first group including a respective sub-counter on at least a first node and a second node;
      sending, by a different computer in the computer system, a second update request to a second group of the plurality of sub-counter groups, the second group including a respective sub-counter on at least the first node and a third node;
      updating, by the second node, a first sub-counter of the first group; and
      updating, by the third node, a first sub-counter of the second group.

5. The method of claim 4, further comprising updating, concurrently by the first node, respective second sub-counters of the first and second groups.

6. The method of claim 1, further comprising placing the sub-counters for individual ones of the plurality of sub-counter groups on different sets of nodes such that a given sub-counter group is placed on a different combination of nodes than other sub-counter groups.

7. The method of claim 6, wherein the placing of the sub-counters of the plurality of sub-counter groups includes placing the sub-counter groups such that for a given number of 'n' nodes in the plurality of nodes, the event counter is capable of being modified and read without loss of count data for up to (n−1)/2 node failures.

8. A non-transitory, computer-readable medium having instructions stored thereon that are executable by a computer system to perform operations comprising:
   distributing a plurality of sub-counter groups associated with an event counter across a plurality of nodes, wherein a plurality of sub-counters for respective ones of the sub-counter groups are located on different nodes of the plurality of nodes;
   in response to an occurrence of an event associated with the event counter, updating a sub-counter value of a selected one of the plurality of sub-counter groups, wherein the updating includes sending concurrent update requests to at least two sub-counters of the selected sub-counter group wherein the at least two sub-counters are located on different nodes; and
   reading a current count value of the event counter using a sum of sub-counter values for the plurality of sub-counter groups as the current count value.

9. The non-transitory, computer-readable medium of claim 8, wherein reading a current count value of the event counter includes reading at least one sub-counter value from a proper subset of the plurality of nodes, wherein the proper subset includes at least two nodes.

10. The non-transitory, computer-readable medium of claim 8, further comprising, in response to determining that a particular node of the plurality of nodes is unavailable, eliminating from selection for modification, sub-counter groups having a sub-counter on the particular node.

11. The non-transitory, computer-readable medium of claim 8, wherein no two sub-counter groups are included on a same set of nodes.

12. The non-transitory, computer-readable medium of claim 11, wherein distributing the sub-counter groups includes distributing the sub-counter groups such that for a given number of 'n' nodes in the plurality of nodes, the event counter is capable of being modified and read without loss of count data for up to (n−1)/2 node failures.

13. The non-transitory, computer-readable medium of claim 8, wherein the occurrence of the event is an access of a record in a database.

14. The non-transitory, computer-readable medium of claim 8, further comprising:
   distributing a different plurality of sub-counter groups associated with a different event counter across the plurality of nodes; and
   in response to the occurrence of the event, updating a sub-counter value of a selected one of the different plurality of sub-counter groups.

15. A system, including:
   a plurality of nodes; and
   a computer configured to:
      implement a plurality of event counters that each have a plurality of sub-counter groups, wherein ones of the sub-counter groups include respective sets of sub-counters that are located on different ones of the plurality of nodes; and
      in response to an occurrence of an event, select a two or more nodes of the plurality of nodes to update; and
      send concurrent requests to the two or more nodes, wherein the two or more nodes are configured to, independently:
         receive the requests from the computer;
         determine, based on a set of rules, which of the plurality of event counters to update in response to the requests; and
         modify a respective sub-counter value that is located on a corresponding one of the two or more nodes and is included in the determined event counter.

16. The system of claim 15, wherein the computer is further configured to include, in the concurrent requests, one or more details of the event occurrence.

17. The system of claim 15, wherein to implement the plurality of event counters, the computer is further configured to assign an index value, that is indicative of two or more nodes, to respective ones of the plurality of sub-counter groups, wherein at least two of the event counters include respective pluralities of sub-counter groups that have the same set of indexes; and
   wherein to send the concurrent requests, the computer is further configured to send an index value indicative of the selected two or more nodes and to exclude an indication of which event counter to update in the two or more nodes.

18. The system of claim 17, wherein the two or more nodes are further configured to maintain current values of sub-counter values of the sub-counter groups that were not determined to be updated.

19. The system of claim 17, wherein in response to determining that a particular node of the plurality of nodes is unavailable, eliminating from selection, sub-counter groups having an index value corresponding to the particular node.

20. The system of claim 15, wherein the plurality of nodes are further configured to:
   retrieve the set of rules from a particular database in response to booting; and
   poll the particular database for an updated set of rules after a particular amount of time has elapsed from the booting.

* * * * *